No. 790,184. PATENTED MAY 16, 1905.
G. CARLSON.
CONFECTIONERY COATING MACHINE.
APPLICATION FILED MAR. 5, 1904.

3 SHEETS—SHEET 1.

No. 790,184. PATENTED MAY 16, 1905.
G. CARLSON.
CONFECTIONERY COATING MACHINE.
APPLICATION FILED MAR. 5, 1904.
3 SHEETS—SHEET 3.
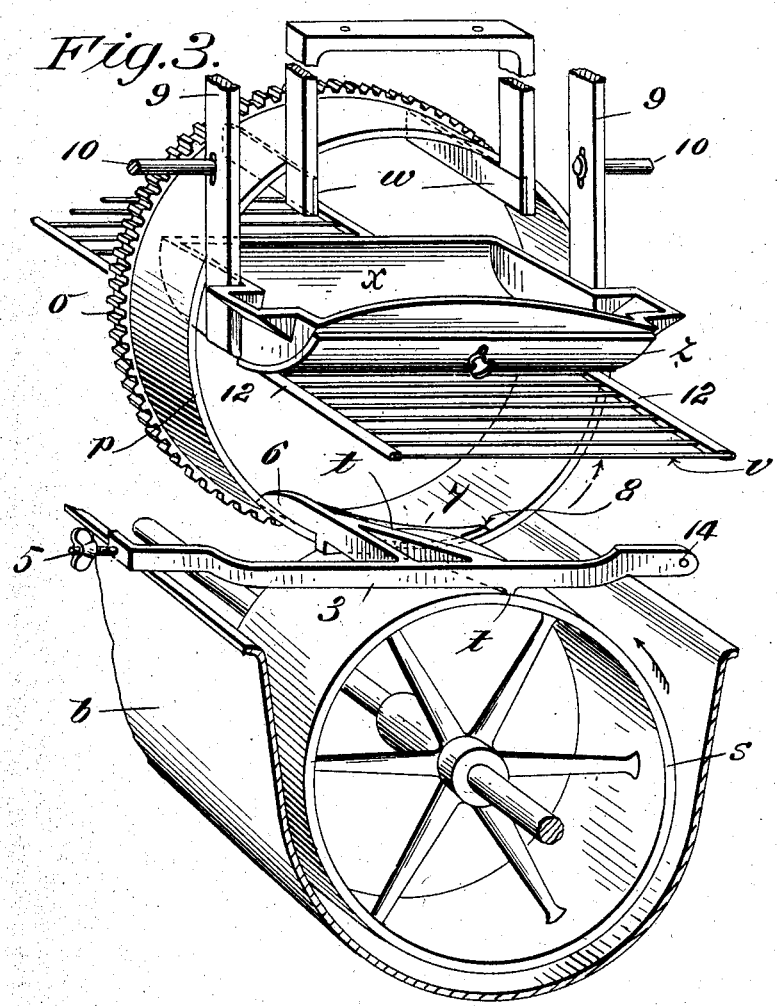
Fig.3.
Fig.4.
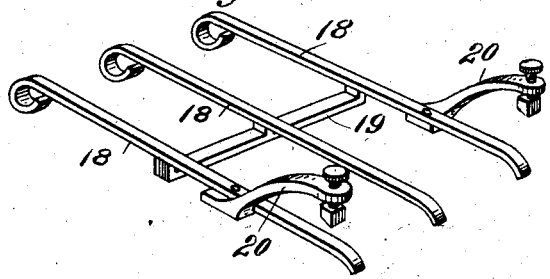
Witnesses: Inventor,
J. R. Garfield Gabriel Carlson
M. G. Crozier by Chapin & Lee
Attorneys.

No. 790,184. Patented May 16, 1905.

UNITED STATES PATENT OFFICE.

GABRIEL CARLSON, OF SPRINGFIELD, MASSACHUSETTS, ASSIGNOR TO CONFECTIONERS' MACHINERY AND MANUFACTURING COMPANY, OF SPRINGFIELD, MASSACHUSETTS, A CORPORATION.

CONFECTIONERY-COATING MACHINE.

SPECIFICATION forming part of Letters Patent No. 790,184, dated May 16, 1905.

Application filed March 5, 1904. Serial No. 196,727.

*To all whom it may concern:*

Be it known that I, GABRIEL CARLSON, a citizen of the United States of America, residing at Springfield, in the county of Hampden and State of Massachusetts, have invented new and useful Improvements in Confectionery-Coating Machines, of which the following is a specification.

This invention relates to confectionery machinery, and particularly to machines for coating confections, as with liquid chocolate, one object of the invention being to provide improved chocolate-feeding devices, a further object being to provide a shaking or jolting mechanism for the conveyer forming a part of the machine, whereby the coated confections are prevented from adhering to the conveyer.

Still another object of the invention is to provide certain improvements in the construction of the scrapers associated with the feeding devices for the chocolate or other coating material, whereby the scrapers or certain of them may be readily adjusted.

These improvements are all clearly illustrated in the accompanying drawings, in which—

Figure 1:
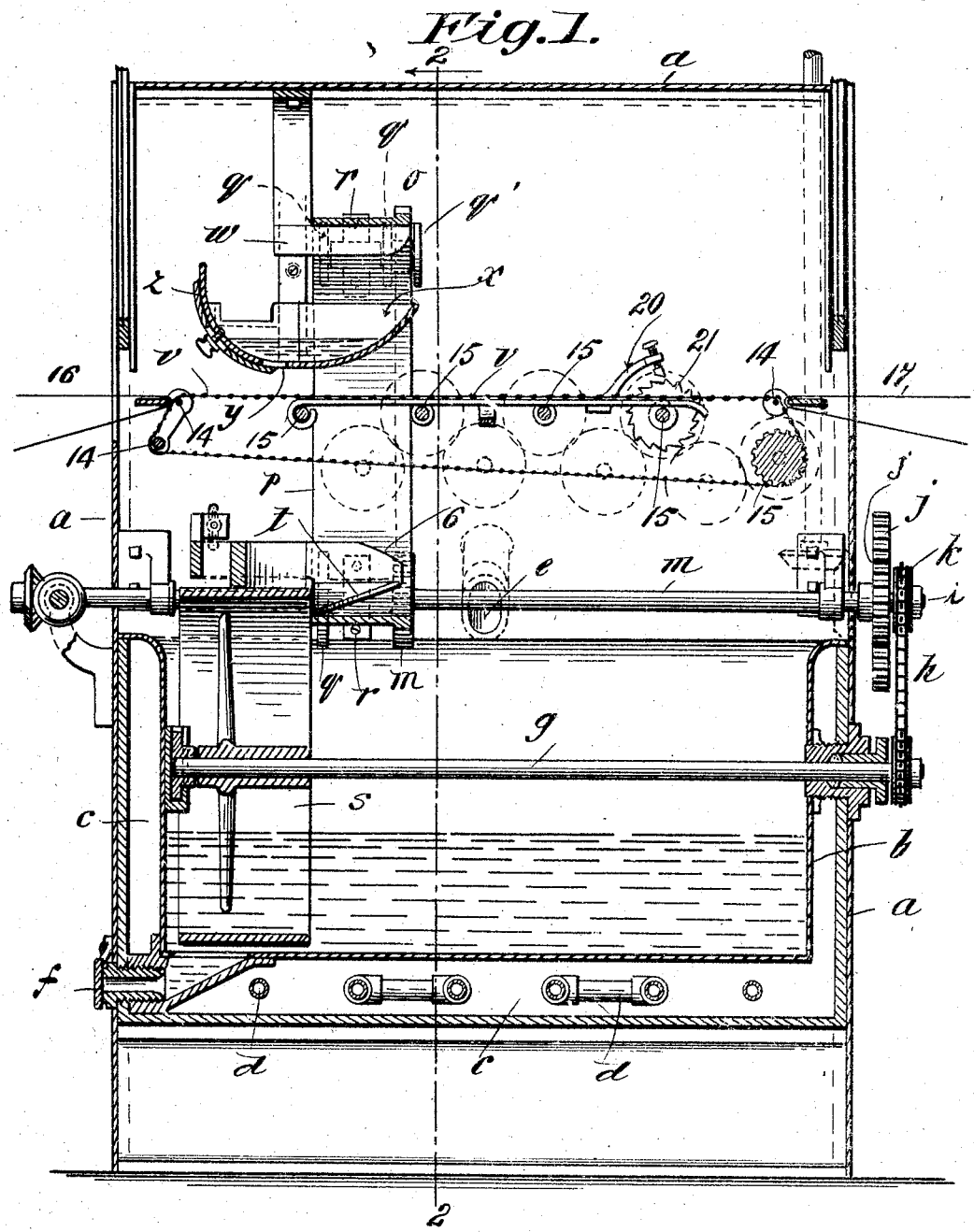
Figure 2:
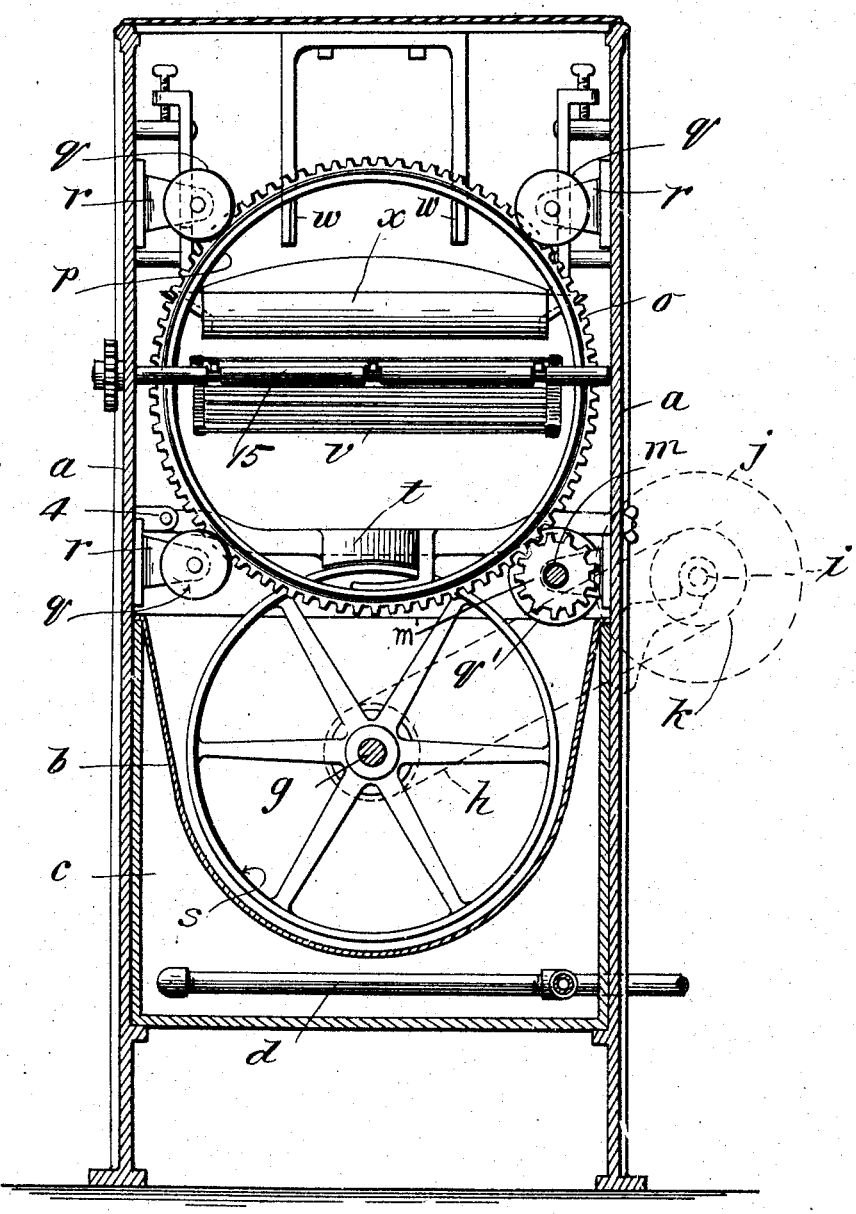

Figure 1 is a sectional elevation taken longitudinally of the machine. Fig. 2 is a transverse section through the machine on line 2 2, Fig. 1, looking to the left, showing the feeding devices in end elevation. Fig. 3 is a perspective view of the feeding devices and a portion of the conveyer running through the machine, together with a portion of the reservoir for the coating material. Fig. 4 is a perspective view of the shaking device located under the conveyer.

Referring now to the drawings, it is seen that the casing $a$ of the machine is of substantially rectangular form and that located in the lower part thereof is a receptacle $b$ for the coating material, the lower part of which is semicircular in cross-section. This receptacle is supported in any suitable way in a chamber $c$, in which steam-pipes $d$ are located, whereby the coating material may be maintained at the proper temperature to give it the required consistency. This coating material may be supplied to the reservoir or withdrawn therefrom through suitably-located openings, as $e$ and $f$. A shaft $g$ extends through the reservoir axially of the curved bottom portion thereof, one end being supported within the reservoir and the other extending through the casing. On the latter end of the shaft means are provided, as the chain $h$, running over a suitable sprocket-wheel on the shaft $g$ to another sprocket-wheel $k$ on a driving-shaft $i$, whose location is shown in dotted lines in Fig. 2. On this driving-shaft $i$ is a gear $j$, which meshes with a smaller gear $j'$ on a shaft $m$, located within the casing, and on this shaft is a pinion $m'$, which engages with a circular rack $o$, disposed around one end of the ring $p$, which is provided with four bearing-rolls $q$, so disposed as to bear on the outer surface of the ring, and whereby the latter is rotatably supported on a fixed axis. Certain of the rolls $q$ are supported on the shaft $m$ and the others on suitable brackets $r$, secured to the casing. As shown in Fig. 1, on each of these brackets $r$ there are two of these bearing-rolls $q$, and on the end of one or more of the shafts which carry these rolls there is fixed a disk $q'$ of larger diameter, which will overlap the edge of the ring $p$ and hold it against endwise movement in one direction, its movement in the opposite direction being prevented by contact of the other parts of the mechanism.

On the shaft $g$ the wheel $s$ is fixed, its diameter being such as to locate its rim close to the wall of the reservoir, as shown in Figs. 2 and 3, and the position of this wheel relative to the ring $p$ is such that the planes of rotation of the two will intersect, as shown in Fig. 2 most clearly, the contiguous edges of these two rotating members being in contact, or nearly so. It is thus seen that the rotation of the driving-shaft $i$ will rotate the wheel $s$ in one direction and through the interposed pinion $k$ will rotate the ring $p$ in the opposite direction, and as the periphery of the wheel $s$ extends above or beyond the periphery of the ring $p$ the coating material adhering to the outside of the wheel $s$ may be scraped off of the surface thereof and deposited on the interior surface of the ring $p$ by means of properly-arranged scrapers $t$, and all of these coating materials being but semiliquid they are readily carried on this ring to a position above the confections which are being conveyed through the machine on a flexible conveyer $v$. At this point other scrapers $w$ are arranged to bear on the interior surface of the ring $p$, scraping off the material, which falls into a trough $x$, extending transversely of the machine and provided with a discharge-opening $y$ in the form of a narrow adjustable slit, the area of which may be determined by moving a sliding cover $z$ to cover more or less of the slit, this cover being held in position by any suitable means, as a thumb-screw. Referring now to the particular construction of these devices, the scraper $t$ is shown in perspective in Fig. 3, and it consists in a bar 3, extending transversely across the machine in close proximity to the periphery of the wheel $s$, near one edge thereof, being pivotally supported at 4 on one side of the machine and provided with a thumb-screw 5 on its other end, whereby it may be adjustably secured to the casing on the opposite side to bring the diagonally-disposed scrapers $t$ to bear properly on the outer surface of the wheel $s$. This diagonally-disposed scraper $t$ is merged into another part of the scraper, (indicated by 6,) which extends nearly or quite through the ring $p$ in a direction substantially parallel with the axis of the latter. The rim of the wheel $s$ extending, as it does, above the ring, the coating-material after having been scraped off of the surface of the former would, to a very considerable extent, run back into the receptacle $b$ if the open space resulting from the overlapping of the edges of the wheel and the ring were not stopped off, as it is, by means of the apron 7, which extends from the point 6 diagonally across the surface of the ring to the point 8 and from thence back toward the point of the scraper $t$ on the wheel $s$ and stopping off this open space between the peripheries of the latter and the ring $p$. Furthermore, this diagonally-disposed edge of the apron 7 effects a more even distribution of the coating material over the interior surface of the ring.

The scraping devices $w$, located above the trough $x$, consist of two straight steel scrapers supported on arms depending from the upper side of the casing. These are made in the usual manner of thin sheet-steel and bear closely against the inner surface of the ring.

The trough $x$ is supported on two arms 9, secured to opposite sides thereof, which engage adjustably two inwardly-extending posts 10, supported on opposite sides of the casing, these devices being so arranged that the trough may be adjusted toward or from the conveyer, as desired. The conveyer is made of parallel wires secured by their ends in some flexible material 12, the conveyer being endless and running over suitable supporting-shafts 14, on one of which is a fluted roll 13, adapted to engage the conveyer and drive it, the shaft on which said roll 13 is secured being rotated by connection with some rotating part of the mechanism. The upper surface of the conveyer is supported at different points by the shafts 15, having rolls thereon on which the conveyer runs in its passage through the machine. The confections are fed onto the conveyer from one endless belt, as 16, and are transferred from the conveyer to another endless belt, as 17, at the opposite end of the machine, which belts enter the casing through suitable openings in the latter.

As the confections pass under the trough $x$ a stream of coating material drenches them, and they then pass on toward the belt 17. This coating material hardens or crystallizes more or less rapidly, and therefore if the confections were undisturbed the coating might adhere to the wires of the conveyer $v$, and then at the point of transfer to the belt 17 part of the coating along the under side of the confections might adhere to the wires and break away from the confection, leaving some of the surface of the latter exposed. To obviate this, it is necessary to jolt or jar the conveyer $v$, whereby the coating readily works in between the wires of the conveyer and the under side of the confections and prevents this adhesion, whereby when the confection arrives at the point of transfer to the belt 17 there will be no breaking away of the coating material in the manner described. This jolting or shaking of the conveyer may be effected in any suitable manner; but a convenient device whereby it may be effected is shown in the drawings, which consists in making a skeleton frame, such as is shown in Fig. 4, composed of the longitudinally-extending members 18, which are hung by one end on one of the shafts 15 nearest the trough $x$ and extend toward the other end of the machine, being united to move as one piece by means of a cross-bar 19. On each side of this frame and near the free ends thereof are two arms 20, the upstanding ends of which overlie two ratchet-wheels, one of which is shown in Fig. 1 and indicated by 21, and in the end of the arms 20 is an adjustable post adapted to rest on the teeth of the ratchet-wheels, the latter being fixed on one of the shafts 15. As the latter rotates, therefore, the shaker-frame will be made to tap rapidly the under side of the conveyer $v$.

The shaking device referred to, whereby a jolting movement is imparted to the confections on the conveyer, is important, not only because it prevents the adhesion of the confections to the conveyer and the better coating of the under side of the confections, but it serves also a further and most useful purpose in that it causes any bubbles that may be lodged in the coating material to break while it is still soft, and thus results in the production of goods having a smooth unbroken exterior surface. A still further advantage of this shaking is that it serves to bring to the surface of the coating material, when the machine is used for coating confections with chocolates, the cocoa-butter, which is one of the ingredients of this coating material, and this gives to the finished product a high gloss and a darker color, whereby the appearance of the goods is much enhanced. It is recognized, of course, that shaking or jolting devices have been heretofore used in connection with other forms of confectionery machinery, more particularly in connection with the "starch-machines," so called, though the application thereof in connection with coating-machines in the novel manner herein described is believed to be new. It will be observed that the location of the trough $x$ and the discharge-slit $y$ is such that the coating material which drains through the conveyer will fall on the wheel $s$ at that point at which the scraper $t$ is located and be directed again into the ring $p$ and again carried up into the trough $x$, mixing with that part of the mixture which has just been taken from the reservoir. It has been found in practice that this manner of elevating the coating material by means of the two oppositely-rotating wheels $p$ and $s$ and a transference of the coating material from the exterior of one to the interior of the other is a very convenient and direct method of conveying the coating material to the trough from which it runs onto the confections to be coated.

Having thus described my invention, what I claim, and desire to secure by Letters Patent of the United States, is—

1. In a confectionery-coating machine of the character described, a reservoir for coating material, and a rotatable member supported therein; a second rotatable member supported above the member in the reservoir and in another vertical plane, the peripheries of said members extending past one another; a device to remove coating material from said first-named member and deposit it on the second, and another device to remove said material from the second member, and a receptacle to receive the material so removed, there being an opening in the bottom of said receptacle.

2. In a confectionery-coating machine of the character described, a reservoir for coating material, and a wheel rotatably supported therein, a conveyer to carry confections through the machine, a ring revolubly supported in a plane parallel with that of the wheel, the peripheries of the ring and wheel extending past one another; a scraper to remove coating material from the exterior surface of the wheel and direct it onto the interior surface of the ring, and another scraper to remove the material from the ring; together with a receptacle located above the conveyer to receive said material removed from the ring, said receptacle having an opening in the bottom thereof.

3. In a confectionery-coating machine of the character described, two rotatable members having substantially parallel axes, said members being located in different vertical planes, and their peripheries extending past one another; a reservoir for coating material within which one of said members rotates, and a scraper to transfer material adhering thereto to said other member; a conveyer encircled by said last-named member, means to remove coating material from said encircling member at a point thereon above the conveyer to effect the deposit thereof on the surface of the conveyer.

4. In a confectionery-machine of the character described, a reservoir for coating material, a wheel to rotate therein, a ring rotatable on supports arranged around the circumference thereof; an endless conveyer-belt running through the ring, a feed-trough located above the conveyer and inside of the ring, a scraper to transfer coating material from the wheel to the ring, and another scraper to remove said material from the ring to cause it to fall into said feed-trough, the latter having an opening in the bottom thereof; means to rotate said wheel and ring in opposite directions, these last-named parts having parallel planes of rotation, their peripheries extending past one another.

5. In combination in a confectionery-coating machine, a conveyer to carry confections through the machine, a reservoir for coating material, a feeding device to carry the material from the reservoir to a point above the conveyer consisting of a rotatable annular member to encircle the conveyer, together with means to supply coating material to one portion of said member, and means to effect the removal of the material from another portion thereof above the conveyer, whereby it may be made to flow on the latter.

GABRIEL CARLSON.

Witnesses:
K. I. CLEMONS,
WM. H. CHAPIN.